(12) United States Patent
Hung et al.

(10) Patent No.: US 11,258,599 B2
(45) Date of Patent: Feb. 22, 2022

(54) STABLE PHYSICALLY UNCLONABLE FUNCTION

(71) Applicant: MACRONIX INTERNATIONAL CO., LTD., Hsinchu (TW)

(72) Inventors: Chun-Hsiung Hung, Hsinchu (TW); Kuen-Long Chang, Taipei (TW); Ken-Hui Chen, Hsinchu (TW); Shih-Chang Huang, Penghu (TW); Chin-Hung Chang, Tainan (TW); Chen-Chia Fan, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 185 days.

(21) Appl. No.: 16/793,986

(22) Filed: Feb. 18, 2020

(65) Prior Publication Data

US 2020/0186339 A1    Jun. 11, 2020

Related U.S. Application Data

(63) Continuation-in-part of application No. 15/601,582, filed on May 22, 2017, now Pat. No. 10,715,340.

(Continued)

(51) Int. Cl.
*H04L 9/08* (2006.01)
*H04L 9/32* (2006.01)
(Continued)

(52) U.S. Cl.
CPC .......... *H04L 9/0877* (2013.01); *G06F 3/0604* (2013.01); *G06F 3/068* (2013.01);
(Continued)

(58) Field of Classification Search
CPC ... H04L 9/3278; H04L 9/0877; H04L 9/0894; H04L 2209/12; G06F 21/62; G06F 2212/1052
(Continued)

(56) References Cited

U.S. PATENT DOCUMENTS 5,442,704 A * 8/1995 Holtey ............... G06Q 20/3576
 711/163
6,947,556 B1   9/2005 Matyas, Jr. et al.
(Continued)

FOREIGN PATENT DOCUMENTS

CN   105007285 A   10/2015
CN   103583013 B    4/2016
(Continued)

OTHER PUBLICATIONS

EP Office Action from EP 18 151 137.9-1218 dated Nov. 5, 2020, 4 pages.
(Continued)

*Primary Examiner* — Samson B Lemma
(74) *Attorney, Agent, or Firm* — Andrew L. Dunlap; Haynes Beffel & Wolfeld LLP

(57) ABSTRACT

A system and method use a physical unclonable function in a PUF circuit on an integrated circuit to generate a security key, and stabilize the security key by storage in a set of nonvolatile memory cells. The stabilized security key is moved from the set of nonvolatile memory cells to a cache memory, and utilized as stored in the cache memory in a security protocol. Also, data transfer from the PUF circuit to the set of nonvolatile memory cells can be disabled after using the PUF circuit to produce the security key, at a safe time, such as after the security key has been moved from the set of nonvolatile memory cells to the cache memory.

15 Claims, 5 Drawing Sheets

Related U.S. Application Data

(60) Provisional application No. 62/822,069, filed on Mar. 22, 2019, provisional application No. 62/435,337, filed on Dec. 16, 2016, provisional application No. 62/435,092, filed on Dec. 16, 2016, provisional application No. 62/431,835, filed on Dec. 9, 2016, provisional application No. 62/430,196, filed on Dec. 5, 2016, provisional application No. 62/423,753, filed on Nov. 17, 2016, provisional application No. 62/370,736, filed on Aug. 4, 2016.

(51) Int. Cl.
*G06F 21/62* (2013.01)
*G06F 3/06* (2006.01)
*G06F 12/0877* (2016.01)

(52) U.S. Cl.
CPC ........ *G06F 3/0659* (2013.01); *G06F 12/0877* (2013.01); *G06F 21/62* (2013.01); *H04L 9/0894* (2013.01); *H04L 9/3278* (2013.01); *G06F 2212/1052* (2013.01); *H04L 2209/12* (2013.01)

(58) Field of Classification Search
USPC .......................................................... 713/193
See application file for complete search history.

(56) References Cited

U.S. PATENT DOCUMENTS

| | | |
|---|---|---|
| 7,356,659 B2 | 4/2008 | Kobayashi et al. |
| 8,145,855 B2 | 3/2012 | Wan et al. |
| 8,290,150 B2 | 10/2012 | Erhart et al. |
| 8,391,070 B2 | 3/2013 | Bathul et al. |
| 8,448,256 B2 | 5/2013 | Borchert et al. |
| 8,694,856 B2 | 4/2014 | Tuyls et al. |
| 8,711,626 B2 | 4/2014 | Lee |
| 8,819,409 B2 | 8/2014 | Kuipers et al. |
| 8,933,516 B1 | 1/2015 | Wu et al. |
| 8,971,527 B2 | 3/2015 | BrightSky et al. |
| 8,995,169 B1 | 3/2015 | Bandyopadhyay et al. |
| 9,001,554 B2 | 4/2015 | Hashim et al. |
| 9,071,446 B2 | 6/2015 | Kreft |
| 9,082,514 B1 | 7/2015 | Trimberger |
| 9,093,128 B2 | 7/2015 | Otterstedt et al. |
| 9,158,906 B2 | 10/2015 | Guajardo Merchan et al. |
| 9,171,144 B2 | 10/2015 | Lewis et al. |
| 9,218,477 B2 | 12/2015 | Lewis et al. |
| 9,245,925 B1 | 1/2016 | Lee et al. |
| 9,298,946 B2 | 3/2016 | Zhu et al. |
| 9,324,436 B2 | 4/2016 | Kim et al. |
| 9,343,135 B2 | 5/2016 | Zhu et al. |
| 9,368,207 B2 | 6/2016 | Bandyopadhyay et al. |
| 9,391,772 B2 | 7/2016 | Suzuki |
| 9,396,357 B2 | 7/2016 | Van Der Leest et al. |
| 9,448,874 B2 | 9/2016 | Kim et al. |
| 9,455,022 B2 | 9/2016 | Yabuuchi et al. |
| 9,455,403 B1 | 9/2016 | Lai et al. |
| 9,461,826 B2 | 10/2016 | Kreft |
| 9,485,094 B1 | 11/2016 | Parvarandeh et al. |
| 9,536,581 B2 | 1/2017 | Katoh et al. |
| 9,548,113 B2 | 1/2017 | Yoshimoto et al. |
| 9,558,358 B2 | 1/2017 | Aissi et al. |
| 9,588,908 B2 | 3/2017 | Cambou |
| 9,646,178 B2 | 5/2017 | Kan |
| 9,653,161 B2 | 5/2017 | Yoshimoto et al. |
| 9,686,248 B2 | 6/2017 | Dover |
| 9,787,480 B2 | 10/2017 | Guo et al. |
| 9,811,689 B1 | 11/2017 | Tseng et al. |
| 9,870,829 B2 | 1/2018 | Park et al. |
| 9,966,467 B2 | 5/2018 | Watanabe |
| 9,985,791 B2 | 5/2018 | Cambou |
| 10,097,348 B2 | 10/2018 | Kara-Ivanov et al. |
| 10,311,930 B1 * | 6/2019 | Kim ..................... G11C 11/161 |
| 10,404,478 B2 | 9/2019 | Hung et al. |
| 10,469,271 B2 | 11/2019 | Hung et al. |
| 10,649,735 B2 | 5/2020 | Chen et al. |
| 10,680,809 B2 | 6/2020 | Chang et al. |
| 10,715,340 B2 | 7/2020 | Hung et al. |
| 10,749,695 B2 | 8/2020 | Hung et al. |
| 10,855,477 B2 | 12/2020 | Hung et al. |
| 10,911,229 B2 | 2/2021 | Hung et al. |
| 2002/0024453 A1 | 2/2002 | Maeda |
| 2006/0221686 A1 | 10/2006 | Devadas et al. |
| 2007/0044139 A1 | 2/2007 | Tuyls et al. |
| 2008/0260152 A1 | 10/2008 | Skoric et al. |
| 2008/0279373 A1 | 11/2008 | Erhart et al. |
| 2009/0165086 A1 | 6/2009 | Trichina et al. |
| 2009/0249014 A1 | 10/2009 | Obereiner et al. |
| 2012/0131340 A1 | 5/2012 | Teuwen et al. |
| 2012/0179952 A1 | 7/2012 | Tuyls et al. |
| 2013/0051552 A1 * | 2/2013 | Handschuh ........... H04L 9/0866 380/44 |
| 2013/0138710 A1 | 5/2013 | Yamamoto et al. |
| 2014/0091832 A1 * | 4/2014 | Gotze .................. H03K 19/003 326/8 |
| 2014/0126306 A1 | 5/2014 | Otterstedt et al. |
| 2014/0137266 A1 | 5/2014 | Chang |
| 2014/0140513 A1 | 5/2014 | BrightSky et al. |
| 2014/0185795 A1 * | 7/2014 | Gotze .................. H04L 9/0866 380/44 |
| 2014/0189365 A1 * | 7/2014 | Cox ....................... H04L 9/0866 713/189 |
| 2014/0189890 A1 * | 7/2014 | Koeberl ................ H04L 9/0866 726/34 |
| 2014/0225639 A1 | 8/2014 | Guo et al. |
| 2015/0012737 A1 | 1/2015 | Newell |
| 2015/0055417 A1 | 2/2015 | Kim et al. |
| 2015/0058928 A1 | 2/2015 | Guo et al. |
| 2015/0070979 A1 | 3/2015 | Zhu et al. |
| 2015/0071432 A1 | 3/2015 | Zhu et al. |
| 2015/0074157 A1 | 3/2015 | Yu et al. |
| 2015/0074433 A1 | 3/2015 | Zhu et al. |
| 2015/0091747 A1 | 4/2015 | Watanabe |
| 2015/0092939 A1 | 4/2015 | Gotze et al. |
| 2015/0143130 A1 | 5/2015 | Ducharme et al. |
| 2015/0154421 A1 | 6/2015 | Feng et al. |
| 2015/0169247 A1 | 6/2015 | Wang et al. |
| 2015/0234751 A1 | 8/2015 | Van Der Sluis et al. |
| 2015/0242158 A1 | 8/2015 | Hung et al. |
| 2015/0278551 A1 | 10/2015 | Iyer et al. |
| 2015/0286914 A1 * | 10/2015 | Kulikovska ............ B42D 25/23 235/488 |
| 2015/0317257 A1 | 11/2015 | Seol et al. |
| 2016/0028544 A1 | 1/2016 | Hyde et al. |
| 2016/0093393 A1 | 3/2016 | Park et al. |
| 2016/0103625 A1 | 4/2016 | Fujimoto et al. |
| 2016/0148664 A1 | 5/2016 | Katoh et al. |
| 2016/0148679 A1 | 5/2016 | Yoshimoto et al. |
| 2016/0148680 A1 | 5/2016 | Yoshimoto et al. |
| 2016/0156476 A1 | 6/2016 | Lee et al. |
| 2016/0218146 A1 | 7/2016 | Lee et al. |
| 2016/0284413 A1 | 9/2016 | Chang |
| 2016/0301534 A1 * | 10/2016 | Chen ..................... H04L 9/3278 |
| 2016/0323096 A1 | 11/2016 | Kara-Ivanov et al. |
| 2016/0328578 A1 | 11/2016 | Plusquellic et al. |
| 2016/0364583 A1 | 12/2016 | Benoit et al. |
| 2017/0046129 A1 | 2/2017 | Cambou |
| 2017/0048072 A1 | 2/2017 | Cambou |
| 2017/0053708 A1 | 2/2017 | Wong et al. |
| 2017/0126414 A1 | 5/2017 | Goel et al. |
| 2017/0279606 A1 | 9/2017 | Kara-Ivanov et al. |
| 2017/0346644 A1 * | 11/2017 | Cambou ................. H04L 9/3278 |
| 2018/0039581 A1 | 2/2018 | Hung et al. |
| 2018/0039784 A1 | 2/2018 | Hung et al. |
| 2018/0040356 A1 | 2/2018 | Hung et al. |
| 2018/0091293 A1 | 3/2018 | Suresh et al. |
| 2018/0123808 A1 | 5/2018 | Hung et al. |
| 2018/0176012 A1 | 6/2018 | Hung et al. |
| 2018/0183613 A1 | 6/2018 | Dafali et al. |

(56) References Cited

U.S. PATENT DOCUMENTS

| | | |
|---|---|---|
| 2018/0191512 A1 | 7/2018 | Tomishima |
| 2018/0278418 A1 | 9/2018 | Chang et al. |

FOREIGN PATENT DOCUMENTS

| | | | |
|---|---|---|---|
| CN | 105493191 A | 4/2016 | |
| CN | 105518786 A | 4/2016 | |
| CN | 105518787 A | 4/2016 | |
| CN | 105632543 A | 6/2016 | |
| CN | 104518780 B | 12/2017 | |
| CN | 105528560 B | 9/2018 | |
| CN | 105474167 B | 11/2018 | |
| EP | 2911086 A1 | 8/2015 | |
| TW | 200913627 A | 3/2009 | |
| TW | 201015554 A | 4/2010 | |
| TW | 201419029 A | 5/2014 | |
| TW | 201500963 A | 1/2015 | |
| TW | 201512893 A | 4/2015 | |
| TW | I693530 B | 5/2020 | |
| WO | 2009002599 A2 | 12/2008 | |
| WO | 2010035202 A1 | 4/2010 | |
| WO | 2014076151 A1 | 5/2014 | |
| WO | 2015035033 A1 | 3/2015 | |
| WO | 2015105687 A1 | 7/2015 | |
| WO | 2015-134037 A1 | 9/2015 | |

OTHER PUBLICATIONS

"Operational Amplifier," Wikipedia definition, downloaded Jan. 30, 2019, 23 pages.
TW Office Action from TW11020667770 with English machine translation (family member of 2303), dated Jul. 13, 2021, 5 pages.
Zhang et al., "TrustTokenF: a Generic Security Framework for Mobile Two-factor Authentication Using TrustZone," IEEE Trustcom/BigDataSE/ISPA, Aug. 20, 2015, pp. 41-48.
EP Extended EP Search Report from 18155514.5 dated Aug. 8, 2018, 8 pages.
EP Extended Search Report dated Aug. 8, 2018 from related Application EP18151137.9-1218, 8 pages.
EP OA dated Oct. 2, 2019 from related Application EP18151137.9—4 pages.
EP OA dated May 18, 2020 from related Application EP18151137.9—5 pages.
Federal Information Processing Standards Publication 140-2 (Supercedes FIPS Pub 140-1, Jan. 11, 1994), "Security Requirements for Cryptographic Modules,", Dec. 3, 2002, 69 pages.
Federal Information Processing Standards Publication 197, Announcing the Advanced Encryption Standard (AES), Nov. 26, 2001, 51 pages.
Fischer, "A Closer Look at Security in Random Number Generators Design," Int'l Workshop on Constructive Side-Channel Analysis and Secure Design COSADE, May 3-4, 2012, pp. 167-182.
Haahr, "Introduction to Randomness and Random Numbers," random.org, https://www.random.org/randomness/, downloaded on Jul. 26, 2017, 4 pages.
Herder et al. "Physical Unclonable Functions and Applications: A Tutorial," Proceedings of the IEEE | vol. 102, No. 8, Aug. 2014, pp. 1126-1141.
NIST Special Publication 800-38D, Dworkin, "Recommendation for Block Cipher Modes of Operation: Galois/Counter Mode (GCM) and GMAC," Nov. 2007, 39 pages.
NIST Special Publication 800-90A, Barker et al., "Recommendation for Random Number Generation Uing Deterministic Random Bit Generators," Jan. 2012, 136 pages.
Ruhrmair, et al. "PUFs at a Glance," Proceedings of the conference on Design, Automation & Test in Europe Article No. 347, Dresden, Germany—Mar. 24-28, 2014, 6 pages.
Texas Instruments Data Sheet bq26100 SHA-1/HMAC Based Security and Authentication IC with SDQ Interface, Jun. 2006, revised Aug 205; 29 pages.
Tiri et al. "A Digital Design Flow for Secure Integration Circuits," IEEE Trans. on Computer-Aided Design of Integrated Circuits and Systems, vol. 25, No. 7, Jul. 2006, 12 pages.
TW Office Action from TW 106124244 dated Nov. 20, 2019, 8 pages.
TW Office Action from TWl 07117219 (family member of 2243), dated Aug. 21, 2019, 8 pages.
U.S. Office Action from U.S. Appl. No. 15/864,445 dated Feb. 6, 2020, 24 pages.
U.S. Office Action from U.S. Appl. No. 16/592,850 dated Nov. 29, 2019, 16 pages.
U.S. Appl. No. 15/601,515 Non-Final Action dated May 17, 2018, 10 pages.
U.S. Appl. No. 15/601,582 Non-Final Action dated Dec. 30, 2019, 24 pages.
U.S. Office Action from U.S. Appl. No. 15/601,251 dated Sep. 5, 2018, 18 pages.
U.S. Office Action from U.S. Appl. No. 15/601,251 dated Mar. 12, 2019, 21 pages.
U.S. Office Action from U.S. Appl. No. 15/601,515 dated Nov. 2, 2018, 10 pages.
U.S. Office Action from U.S. Appl. No. 15/601,515 dated Feb. 8, 2019, 13 pages.
U.S. Office Action from U.S. Appl. No. 15/601,582 dated Jun. 27, 2019, 25 pages.
U.S. Office Action from U.S. Appl. No. 15/857,341 dated Apr. 16, 2020, 24 pages.
U.S. Office Action from U.S. Appl. No. 15/857,341 dated Oct. 18, 2019, 15 pages.
U.S. Office Action from U.S. Appl. No. 15/984,685 dated Oct. 31, 2019, 17 pages.
Xu et al, "Reliable Physical Unclonable Functions Using Data Retention Voltage of SRAM Cells," IEEE Trans. on Computer-Aided Design of ICs and Systems, vol. 34, No. 6, Jun. 2015, 903-914.
Yoshimoto, et al., "A ReRAM-based physically unclonable function with bit error rate < 0.5% after 10 years at 125° C. for 40nm embedded application," 2016 IEEE Symposium on VLSI Technology, Honolulu, HI, Jun. 14-16, 2016, pp. 1-2.

* cited by examiner

STABLE PHYSICALLY UNCLONABLE FUNCTION

PRIORITY APPLICATION

This application claims the benefit of U.S. Provisional Patent Application No. 62/822,069 filed 22 Mar. 2019; which application is incorporated herein by reference; and This application is a continuation-in-part of U.S. patent application Ser. No. 15/601,582 filed 22 May 2017(now U.S. Pat. No. 10,715,340, issued 14 Jul. 2020), entitled NON-VOLATILE MEMORY WITH SECURITY KEY STORAGE, and in which benefit of U.S. provisional applications is claimed, including:

U.S. Provisional Application No. 62/435,337, filed 16 Dec. 2016, entitled Non-volatile Memory Based Physical Unclonable Function;

U.S. Provisional Application No. 62/435,092, filed 16 Dec. 2016, entitled Stable Physically Unclonable Function;

U.S. Provisional Application No. 62/431,835, filed 9 Dec. 2016, entitled Flash-based Physically Unclonable Function;

U.S. Provisional Application No. 62/430,196, filed 5 Dec. 2016, entitled Non-volatile Memory Based Physical Unclonable Function;

U.S. Provisional Application No. 62/423,753, filed 17 Nov. 2016, entitled NVM-based Physically Unclonable Function;

U.S. Provisional Application No. 62/370,736, filed 4 Aug. 2016, entitled NVM-based Physically Unclonable Function.

BACKGROUND

Field

The present invention relates to integrated circuits which include flash memory or other nonvolatile memory, with security features that utilize a unique key or unique identification code.

Description of Related Art

Integrated circuit memory devices comprising nonvolatile memory, such as flash memory, are being developed with very high capacities. Some technologies are considered likely to enable terabit-scale arrays on integrated circuits. Also, memory devices are being deployed in so called "internet of things IoT" devices, interconnected by networks that operate with, for example, internet protocol communications technologies. A concern for IoT devices, and other devices that store data, is data security. Thus, security protocols requiring encryption with unique keys, authentication with unique IDs and challenge/response technologies are being deployed.

Security protocols require key management technologies to generate, update, store and protect the unique keys and IDs utilized.

A physical unclonable function (PUF—also called a "physically unclonable function") is a process applied by a PUF circuit to create a unique, random key for a physical entity such as an integrated circuit. Randomness of the key is produced using entropy (in the sense of a degree of randomness) of the results of the PUF as applied to elements of the integrated circuit, which is typically on which the PUF circuit is deployed. Use of a PUF is a solution for generating keys used for chip IDs supporting a hardware intrinsic security (HIS) technology. A PUF is applied to a circuit that is, or includes, a physical entity or entities embodied in a physical structure which produces a code that is easy to evaluate but hard to predict.

PUFs have been used for key creation in applications with high security requirements, such as mobile and embedded devices. An example PUF is a ring-oscillator PUF, that uses entropy arising from the manufacturing variability intrinsic to circuit propagation delay of gates. Another example PUF is an SRAM PUF, where threshold voltage differences in the transistors result in the SRAM powering up in either a logic "0" or logic "1". See "*Physical Unclonable Functions and Applications: A Tutorial*" by Charles Herder et al., Pages 1126-1141, Proceedings of the IEEE|Vol. 102, No. 8, August 2014.

A PUF that uses entropy arising from physical properties of resistive random access memory has been proposed. See "*A ReRAM-based Physically Unclonable Function with Bit Error Rate<0.5% after 10 years at 125° C. for 40 nm embedded application*" by Yoshimoto et al., Pages 198-199, 2016 Symposium on VLSI Technology Digest of Technical Papers. The application presented in the paper proposes an improvement on the conventional ID-generating method of ReRAM-PUF which increases bit error rates due to aging degradation. However, in this ReRAM-based PUF, the data created can still be corrupted by drift in the resistance of the memory cells, which can make a bit error rate unacceptable when accessing or using the stored key. Such resistance drift can be more pronounced at high temperature encountered in some applications of integrated circuits, such as in automotive applications.

When using data sets generated using PUF circuits, prior art technologies have relied upon error correcting codes to improve reliability because of the problems with high bit error rates. See, for example, Lee et al., U.S. Patent Application Publication No. 2016/0156476, "Physically Unclonable Function Circuits and Methods of Performing Key Enrollment in Physically Unclonable Function Circuits," published 2 Jun. 2016.

It is desirable to provide technology for integrated circuits including nonvolatile memory that supports the use of PUF-generated keys and other unique keys. Further, it is desirable that devices deploying the technology be easy to make but produce codes that are practically impossible to duplicate or predict, even knowing the exact manufacturing process that produced it.

SUMMARY

PUF circuits and methods are described which can improve the reliability and efficiency of security protocols using security keys generated using PUF circuits that apply a PUF to physical elements, and which can be implemented on integrated circuits, including integrated circuits can be deployable for uses with high security requirements.

In some applications of the technology, unique and private secret keys are required for security protocols including authentication or data encryption/decryption functions. The PUF circuits on the integrated circuits can be used in the production of unique and private secret keys.

The devices and methods described herein are suitable for use in internet-of-things devices. The devices and methods described can be implemented in a wide variety of environments.

A device is described, which can be implemented on a single packaged integrated circuit or a multichip module (i.e., a package including multiple chips), that comprises logic to produce a security key using a physical unclonable function applied to PUF circuit elements in a PUF circuit, and to store the security key in a set of nonvolatile memory cells, thereby providing a stabilized key. Also, security logic is included having cache memory coupled to the set of nonvolatile memory cells. Security logic moves the stabilized security key from the set of nonvolatile memory cells to the cache memory, and accesses the cached security key stored in the cache memory for execution of a security protocol. Access control circuits are coupled to the set of nonvolatile memory cells. The access control circuits can include logic to disable data transfer from the PUF circuit to the set of nonvolatile memory cells after storing the security key in the set of nonvolatile memory cells. In one embodiment, the access control circuits may disable data transfer from the PUF circuit to the set of nonvolatile memory cells, after moving the security key to the cache memory. In some embodiments, the PUF circuit elements are usable for other purposes after the access control logic disables data transfer from the PUF circuit to the set of nonvolatile memory cells.

The security key can have a width, such as 1028 bits, 512 bits, or any other width suitable for particular implementations. The cache memory can have a width that is at least as large as the width of the security key. In some embodiments, the cache memory may store a plurality of security keys. Security logic traverses the security key in the cache memory using a data path that is smaller than the width of the key, such as one byte, 2 bytes or 4 bytes. Utilizing cache memory to store a cached security key, which is a copy of, or derived from, the stabilized security key, and security logic using the cached security key during execution of the security protocol can significantly improve performance and reliability.

In embodiments described herein, the circuit can include a memory array, and control circuits for read and write access to the memory array in response to external commands. Security logic can perform the security protocol to enable access to the memory array in response to the external commands. In some embodiments, the set of nonvolatile memory cells used to stabilize the key can be within the memory array.

Examples are described in which the PUF circuit applies the PUF to memory cells in the cache memory, which can comprise SRAM memory cells in some examples. In these embodiments, the cache memory can be utilized both for the purposes of supporting the generation of a security key, and for the purposes of storage of a stabilized key during execution of the protocol using the security key. Also, examples are described in which the PUF circuit comprises memory cells in a nonvolatile memory array on the integrated circuit.

According to another aspect, a method is described for operating an integrated circuit. The method includes using a physical unclonable function in a PUF circuit on the integrated circuit to generate a security key, and stabilizing the security key by storage in a set of nonvolatile memory cells. The method includes moving the stabilized security key from the set of nonvolatile memory cells to a cache memory, and utilizing the cached security key stored in the cache memory in a security protocol. Also, the method includes disabling data transfer from the PUF circuit to the set of nonvolatile memory cells after using the PUF circuit to produce the security key. The method can include traversing the security key in the cache memory using a data path that is smaller than the width of the security key, while the cache memory has a width at least as large as the width of the security key.

Other aspects and advantages of the present invention can be seen on review of the drawings, the detailed description and the claims, which follow.

DETAILED DESCRIPTION

Figure 1:
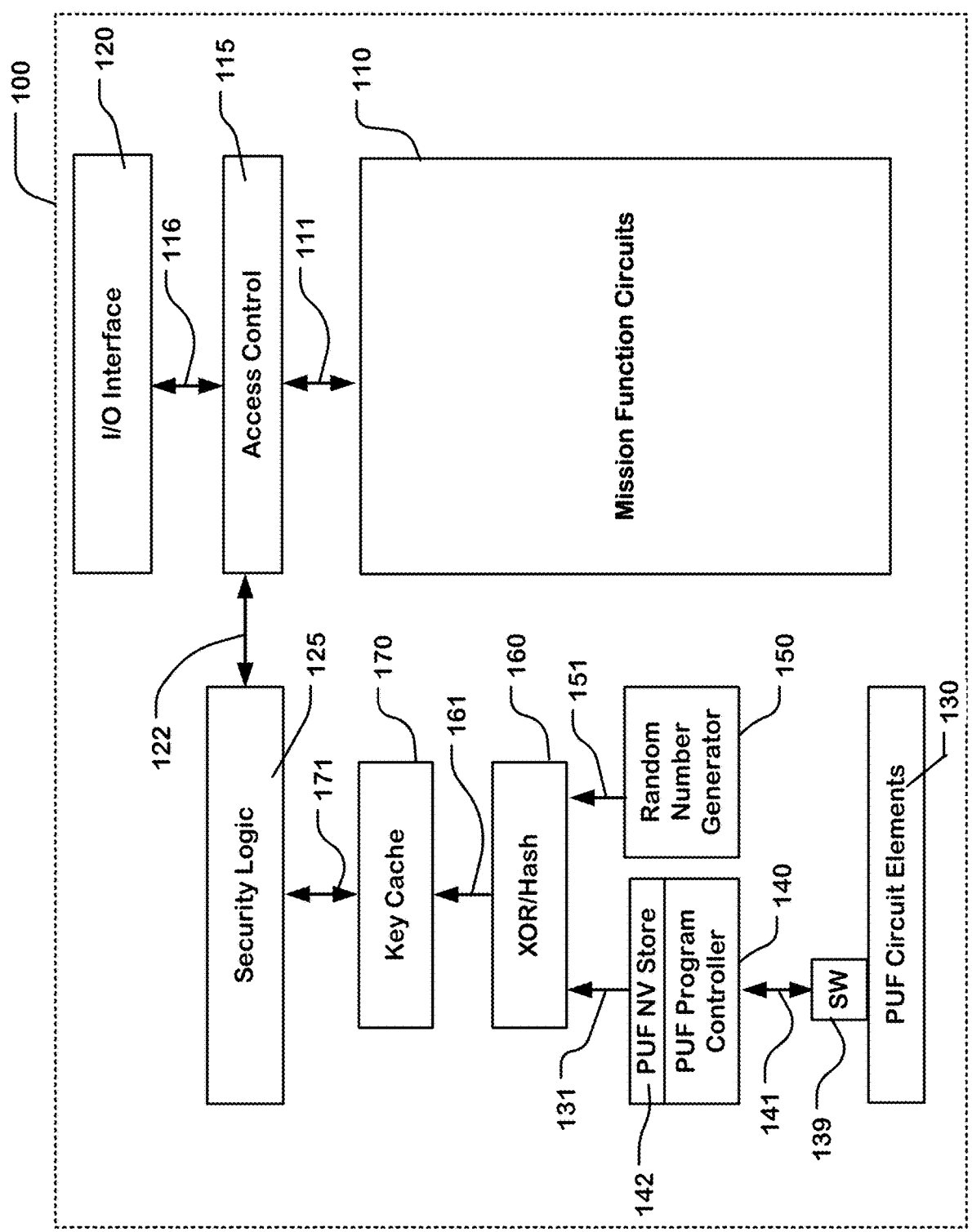
FIG. 1 is a block diagram of an integrated circuit including security logic as described herein utilizing PUF circuits and cache memory.

A detailed description of embodiments of the present technology is provided with reference to the Figures. It is to be understood that there is no intention to limit the technology to the specifically disclosed structural embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. Like reference numerals commonly refer to like elements in various embodiments.

FIG. 1 is a simplified block diagram of an apparatus comprising a plurality of programmable memory cells, and a controller for executing a PUF and a random number generator to provide a data set using the plurality of programmable memory cells. In this example, the apparatus comprises an integrated circuit 100 having PUF circuit elements 130. A PUF can be applied to the PUF circuit elements 130, which provide entropy used to form a unique data set.

The integrated circuit 100 includes mission function circuits 110, which can comprise special purpose logic sometimes referred to as application-specific integrated circuit logic, data processor resources such as used in microprocessors and digital signal processors, large-scale memory such as flash memory, SRAM memory, DRAM memory, programmable resistance memory and combinations of various types of circuits known as system-on-a-chip SOC configurations or application-specific integrated circuits ASICs. The integrated circuit 100 includes an input/output interface 120, which can comprise wireless or wired ports providing access to other devices or networks. In this simplified illustration, an access control block 115 is disposed between the input/output interface 120, and the mission function circuits 110. The access control block 115 is coupled by bus 116 to the input/output interface 120, and by bus 111 to the mission function circuits 110. An access control protocol is executed by the access control block 115 to enable or disable communications between the mission function circuits 110 and the input/output interface 120, to provide encryption or decryption of data traversing the input/output interface 120, and to provide other services in support of the security logic or to provide combinations of the same.

In support of the access control block 115, security logic 125 is disposed on the chip in this example. Security logic 125 is coupled to PUF circuit elements 130. The PUF circuit elements 130 can be exercised by a physical unclonable function controlled by the controller 140 (or other PUF circuit to apply the PUF), to produce a PUF security key. The controller 140 can stabilize the produced security key by storage in a nonvolatile store 142 to provide a stabilized security key. The nonvolatile store 142 can be implemented using a set of flash memory cells, ReRAM cells, phase change memory cells or other type of memory cells. In this example, the security logic 125 is also coupled to a random number generator 150 that generates a random number on a bus 151. Logic circuitry 160 can combine the stabilized initial key and the random number to produce an enhanced security key. The enhanced security key can be stored in a cache memory 170 via a bus 161 to form a cached security key. Alternatively, the initial stabilized key stored in the nonvolatile store 142 can be transferred directly to the cache memory 170 to form the cached security key, without intervening operations. Also, in some embodiments, the random number may be combined with the cached security key stored in the cache memory 170 rather than before it is stored there.

In embodiments using the random number generator 150, logic circuitry 160 can include an XOR function using the initial key and the random number as inputs and producing an output as the enhanced key, and a hash function mapping the initial key and the random number (or in embodiments not utilizing the random number or other data to enhance or modify the initial key, mapping the initial key alone) to hash values as the enhanced security key. In some examples, the initial PUF key on line 131 can have N bits, the random number on bus 151 can have M bits and the security key stored in the cache memory 170 can have X bits, where X is smaller than N+M, or in other embodiments, X is smaller than at least one of M and N. The security key stored in the cache memory 170 that is at least as wide as the security key and is accessible by the security logic 125 on a link 171 which can have a width that is less than the width of the security key. The link 171 can be one to four bytes wide for example. The security key in the cache memory 170 can be efficiently utilized by the security logic. The security protocol executing in the security logic 125 can control communications across line 122 with the access control block 115, and can control the access control block to enable and disable communications via the I/O interface 120.

In one example of the apparatus, the PUF circuit applies the PUF to elements comprising an array of flash memory cells, and the PUF program controller 140, implemented for example as a state machine on the integrated circuit with the PUF circuit elements 130, provides signals to control the application of bias arrangement supply voltages to the array to carry out the procedures to generate the data set, and other operations involved in accessing the array and for reading the data set provided using the memory array. Circuitry, which is on the integrated circuit, such as bit lines, word lines, drivers for the same and so on, provides access to the set of memory cells used to provide a data set.

In other examples, the PUF circuit can apply the PUF to other types of memory cells, such as DRAM or SRAM cells, logic cells or electrical components on the integrated circuit, including is some embodiments the memory cells in the cache memory, which can be exercised using biasing operations to generate physical unclonable functions to produce a data set usable as a security key.

A PUF program controller 140 on the integrated circuit includes logic to perform some or all of the operations used to generate the data set. In one embodiment, the PUF program controller 140 on the integrated circuit includes the logic necessary to apply a PUF to the PUF circuit elements 130 including to perform the biasing operations, and can execute the logic in response to a set-up command from an external source, without control from an off-chip system.

In some embodiments, the PUF program controller 140 includes a switch 139 or other logic to lock-out data transfer between the PUF circuit and the nonvolatile store 142, in response to an indicator set after the PUF circuit is used to generate a security key and the security key is stabilized by storage in the nonvolatile store 142, preventing the circuit from overwriting the stabilized security key, and to help isolate the PUF circuit so that it might be used for other purposes.

In some embodiments, the PUF circuit elements 130 can comprise SRAM cells or other memory cells supporting fast read and write operations. Also, the cache 170 in these examples can be or include the same SRAM cells or memory cells, or SRAM cells or memory cells in the same array as the cells used as the PUF circuit elements 130. This conserves resources on the device, because after used to generate the PUF security key, the PUF circuit elements are available for other use.

The controller can be implemented using special-purpose logic circuitry including a state machine as known in the art. In alternative embodiments, the controller comprises a general-purpose processor, which can be implemented on the same integrated circuit, which executes a computer program to control the operations of the device. In yet other embodiments, a combination of special-purpose logic circuitry and a general-purpose processor can be utilized for implementation of the controller.

In some embodiments, an external processor system can include circuitry for providing access to the integrated circuit and logic used for generation of the data set. The external processor system can include circuitry such as wafer probe circuits, control buses, voltage sources, and the like, used to provide the data set in combination with the circuitry on the integrated circuit. Logic circuits and biasing circuitry having access to the set of memory cells used to control the procedures can include parts on both the external processor system and the integrated circuit.

Examples of the PUF circuit elements 130 described herein can comprise charge trapping memory cells such as utilized in some kinds of flash memory.

The charge storage structures in charge trapping memory cells can include multilayer dielectric charge trapping structures known from flash memory technologies as ONO (oxide-nitride-oxide), ONONO (oxide-nitride-oxide-nitride-oxide), SONOS (silicon-oxide-nitride-oxide-silicon), BE-SONOS (bandgap engineered silicon-oxide-nitride-oxide-silicon), TANOS (tantalum nitride, aluminum oxide, silicon nitride, silicon oxide, silicon), and MA BE-SONOS (metal-high-k bandgap-engineered silicon-oxide-nitride-oxide-silicon). Also, the PUF circuit elements 130 can comprise floating gate memory cells such as utilized in some kinds of flash memory.

In other embodiments, the memory cells used in the PUF circuit elements 130 to provide the data set can include programmable resistance memory cells or other types of memory cells. The programmable resistance memory cells used to provide the data set can include a programmable element having a programmable resistance readable with reference to threshold resistances. The programmable resistance element can comprise, for example, a metal oxide or a phase change material. Examples of algorithms to apply a PUF to a PUF circuit are described in commonly owned, U.S. patent application Ser. No. 15/601,582, filed 22 May 2017, entitled Non-Volatile Memory With Security Key Storage (US 2018/0039581 A1), which is incorporated by reference as if fully set forth here.

Figure 2:
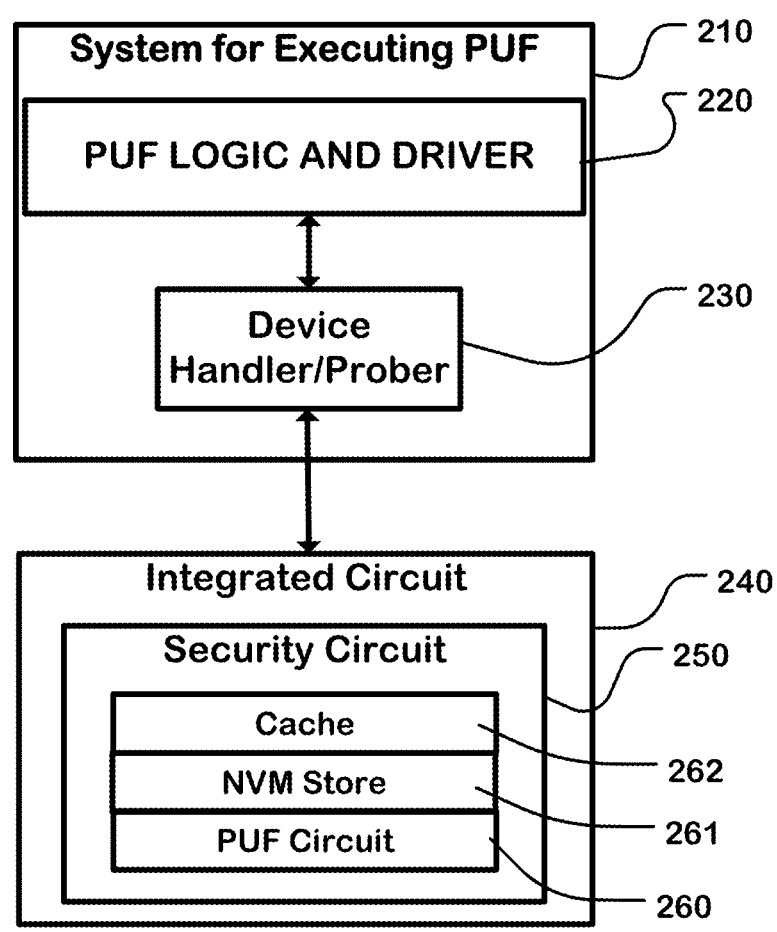
FIG. 2 is a simplified block diagram of an apparatus comprising a system including a hose and an integrated circuit, for executing a PUF operation to enroll the integrated circuit in a security protocol.

FIG. 2 illustrates an apparatus comprising a processor system 210 used for executing or causing execution of a process to generate a data set as discussed herein, and an integrated circuit 240. The integrated circuit 240 is connected to the processor system 210 during manufacturing before packaging, such as in wafer form in some embodiments. In other embodiments, the system 210 is connected to the integrated circuit in a packaged form.

An example system used for executing a process to generate a PUF-based data set on an integrated circuit can include a programmed process executed in a manufacturing line using equipment used for testing, or using equipment like that used for testing, which includes circuitry for accessing the integrated circuit such as wafer probe circuits, voltage sources, and the like. For example, a manufacturing line may have multiple device testers, multiple device probers, multiple device handlers, and multiple interface test adapters configured to connect to the integrated circuits which can be configured to control execution of the procedures described herein. In an alternative, a system may be configured to interact with packaged integrated circuits and may be deployed away from the manufacturing line for the integrated circuit, such as at an assembly installation for an original equipment manufacturer utilizing the integrated circuits.

As shown in FIG. 2, an example system 210 includes PUF logic and driver 220, and a device handler/prober 230. An integrated circuit 240 to be subjected to the PUF logic and driver 220 is coupled to the device handler/prober 230. The integrated circuit 240 includes a security circuit 250. The security circuit 250 includes a PUF circuit 260, a nonvolatile store 261, and a cache 262.

The integrated circuit 240 can be implemented as described with reference to FIG. 1. During manufacturing of the integrated circuit 240, the system 210 performs the actions identified herein to produce the data set including a stabilized key, and can save a copy of the data set, or data derived from the data set, in the nonvolatile store 261. Thereafter, a data path between the PUF circuit 260 and the nonvolatile store 261 can be locked. At or before a time of use of the stabilized data set, it is transferred to the cache 262, allowing for high speed access by the security circuit 250 to the cached, stabilized data set used as the PUF key. Thereafter, PUF circuit elements, in case they are memory cells or other elements having utility in operation of the circuit, in the PUF circuit 260 may be released for use to store other data.

In alternative embodiments, in the field, after manufacturing of an integrated circuit, a user can generate a data set in the PUF circuit 260 on the integrated circuit, for example using the processor system 210 as a host, so the data set can be saved as a shared secret between the integrated circuit and a processor system (e.g. 210) in the field, rather than in the factory.

Figure 3:
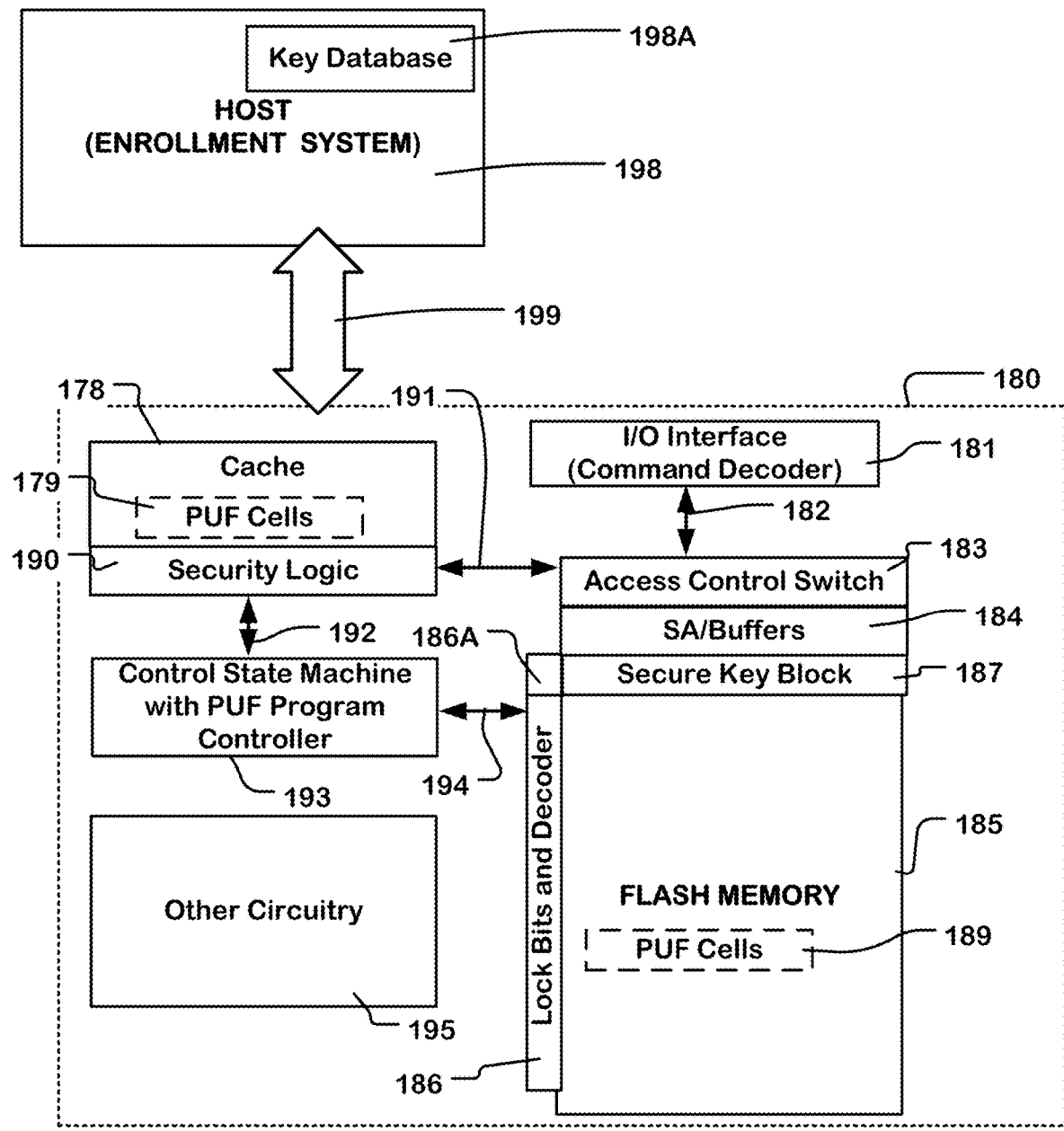
FIG. 3 is a block diagram of an alternative integrated circuit including security logic as described herein utilizing PUF circuits and cache memory.

FIG. 3 illustrates a system including a packaged integrated circuit or multichip module 180 that includes an input/output interface 181 (which includes or is coupled to a command decoder for receipt and communication of external commands from a host, and for enabling and coordinating operations of control circuits) and a nonvolatile flash memory array 185. The input/output interface 181 provides a port for external communication of data between external devices or communication networks and the nonvolatile memory array 185. The memory array 185 includes a plurality of blocks of memory cells including a particular block 187 of the plurality of blocks usable to form the stabilized key. Security logic 190 is coupled to the nonvolatile memory array 185, which utilizes the key in a protocol to enable access to data stored in blocks in the plurality of blocks. The security logic 190 can transfer the security key from the secure key block 187 to a cache memory 178 for use in security protocols.

Access control circuits including the access control switch 183 are coupled to the array and include logic to enable access to the particular block 187 by the security logic for use in the protocol, and to prevent access to the particular block 187 via the port by external devices or communication networks. The access control circuits can also lock out data transfer from the circuit elements to which the PUF is applied, to the block 187 as discussed herein, after the security key is stored in the block 187, or after the security key is transferred to the cache memory 178.

Other combinations of access rules can be used in various embodiments, allowing the security logic greater flexibility in the utilization of the particular block.

In this example, the nonvolatile memory array 185 comprises flash memory. The particular block 187 storing the key can be physically located anywhere in the array, but as illustrated can be located physically in a top block having the lowest physical address, or adjacent a boot block having a lowest physical address, for a couple of examples.

The nonvolatile memory array 185 is coupled to sense amplifiers/buffers 184 which provide for flow of data into and out of the flash memory array, including the particular block 187 storing the key. The access control switch 183 is disposed in this example between the sense amplifiers/buffers 184 and the input/output interface 181. The data read from the array 185 can be routed on line 182 to the input/output interface 181, or can be routed on line 191 to the security logic 190. The security logic 190 includes a cache memory 178, used as working memory during execution of the security function.

In the illustrated embodiment, an address decoder 186 is coupled to the array 185, along with block lock bits which are used for controlling permission to read and write data in corresponding blocks in the array. In this example, the particular block 187, in which the set of nonvolatile memory cells storing the security key is disposed, is coupled with corresponding lock bit or bits 186A. The lock bit or bits 186A coupled with the particular block 187 can comprise a different logical or physical structure than the structure used for the lock bits of other blocks in the array, and can perform logically a different function. Examples of physical structures used to store the block lock bits include a fuse, a one-time-programming (OTP) cell, and a register or other memory element usable to store status indicators like block lock bits. The block lock bit or bits for the particular block can be coupled to the buffers in the sense amplifiers/buffers 184 to inhibit writes to the set of memory cells in which the key is stored, thereby freezing the key stored in the particular block after it is written there and optionally tested and verified. One example of protection of blocks of memory from modification including using protection codes is shown in Hung et al., U.S. Patent Application Publication No. US 2015-0242158, entitled "Nonvolatile Memory Data Protection Using Nonvolatile Protection Codes and Volatile Protection Codes," published 27 Aug. 2015, (now U.S. Pat. No. 9,940,048) which is incorporated by reference as if fully set forth herein.

Also, the block lock bit or bits 186A associated with the particular block 187 that stores the key can control logic coupled to the access control switch 183 that prevents data flow from the particular block 187 through the sense amplifiers/buffers on line 182 to the input/output interface 181, while allowing the data flow from the particular block 187 on line 191 to the cache memory, when an address used to access the array corresponds to the address of the particular block 187.

Also, in the illustrated embodiment, a flash control state machine 193 with a physical unclonable function program controller is coupled to the memory array 185 on line 194, and to the security logic 190 on line 192. The physical unclonable function can be applied to a memory cells in a particular set of memory cells 189 in the array 185 which act as PUF circuit elements for the purposes of producing a data set to be used as the key. In this example of the apparatus, flash control state machine 193 provides signals to control the application of bias arrangement supply voltages to carry out the PUF procedures to generate the data set, and other operations involved in accessing the array 185.

Circuitry, which is on the integrated circuit such as bit lines, word lines, drivers for the same, and so on, provides access to the set of flash memory cells used to provide a data set used to produce the key.

Also, the physical unclonable function can be applied to memory cells, in a particular set of memory cells 179 in the cache memory 178, which act as a PUF circuit elements for the purposes of producing a data set to be used as the key, in an alternative to use of the memory cells 189 in the flash memory array 185. In this example of the apparatus, flash control state machine 193 provides signals to control the application of bias arrangement supply voltages to carry out the PUF procedures to generate the data set, and other operations involved in applying the PUF to elements 179 in the cache memory 178.

As illustrated, packaged integrated circuit or multichip module 180 can also include other circuitry 195, such as can be encountered in a system-on-a-chip system or other combinations of circuitry with memory.

The packaged integrated circuit or multichip module 180 is coupled in the example shown to host 198 which, for systems including those configured for many devices, can be an enrollment system by interconnect 199. The host 198 can maintain a key database 198A, in which information needed to perform the security protocol relying on the key stored in the cache memory 178, can be maintained. In some embodiments, the information needed to perform the security protocol includes a copy of the key.

In one example operating method, during manufacture or packaging, the physical unclonable function can be executed by the flash control state machine 193, in cooperation with the host 198.

The data set, upon completion of the execution of the physical unclonable function, can then be copied from the set of memory cells 189 (or 179) used as the PUF circuit to the particular block 187 reserved or configured for stabilizing the key. The system can produce one or many keys for storage in the particular block 187 reserved for this purpose. At this stage, the key can also be copied into the host 198 and maintained with the key database 198A. After the execution of the physical unclonable function, and copying of the security key into the particular block 187, the lock bit or bits 186A associated with the particular block 187 can remain set, to disable access to the block by external circuits or communication networks.

Figure 4:
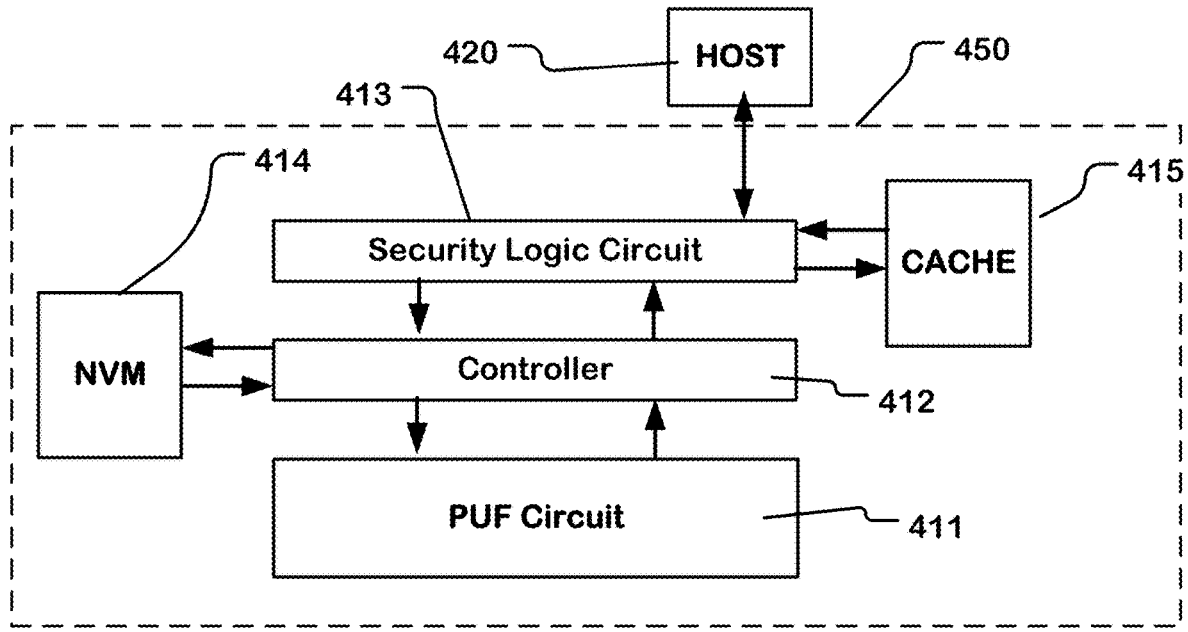
FIG. 4 is a high level diagram of a circuit for efficient use of PUF-generated security keys as described herein.

FIG. 4 illustrates a high level configuration of a system utilizing a physical unclonable function for the generation of a key, storage of that key in a nonvolatile memory to stabilize the key, and transfer of the stabilized key to a cache during execution of the security function. The system includes a host 420 which is coupled to an integrated circuit or multichip module 450. The integrated circuit or multichip module 450 includes a physical unclonable function (PUF) circuit 411, controller 412, and security logic 413. The controller 412 is coupled to the physical unclonable function circuit 411, the security logic circuit 413 and to a nonvolatile memory 414. The security logic 413 is coupled to a host 420 (via I/O interface circuits not shown), and to a cache memory 415, usable to hold the security key during execution of the security function. In some embodiments both the security logic 413 and the controller 412 can be connected to the cache memory for access to the data therein. The connection of the cache memory 415 to the security logic circuit 413 can also be routed though the controller 412, or the security logic circuit 413 and the controller can share a connection to the cache memory 415. The controller can lock down data transfer from the PUF circuit 411 to the nonvolatile memory 414.

Figure 5:
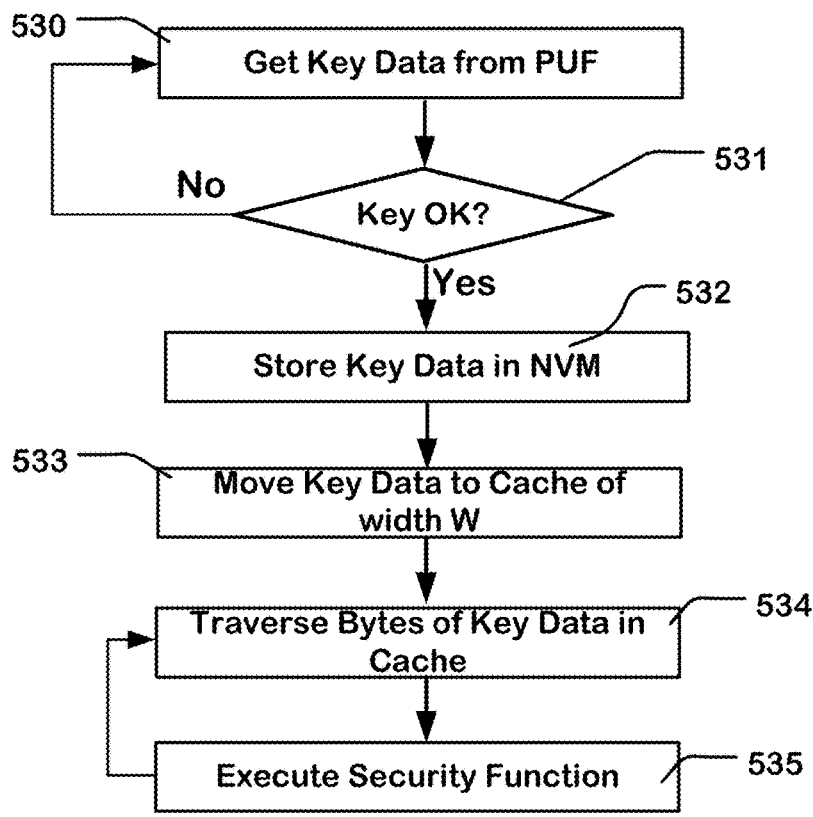
FIG. 5 is a simplified flowchart of a procedure executed by a controller on an integrated circuit for executing a physical unclonable function.

Operation of the system of FIG. 4 can be understood for some embodiments with reference to FIG. 5. This procedure can be initiated in response to a command or other signal from the host 420, and by circuitry in the security logic circuit 413 responsive to other events such as time out events or usage count events, or the other events upon which producing a PUF key can be needed. Thus, in order to produce a key that can be used, key data is generated and retrieved from the physical unclonable function circuit 411 (Step 530). Optionally, the key is analyzed to determine whether it meets security specifications, such as having sufficient randomness (Step 531). If the key meets the specifications, then it is stabilized by storing it into the nonvolatile memory 414 via the controller 412 (Step 532). If it does not meet the specifications, then the process loops to Step 530 to retry the PUF to produce a key. The physical unclonable function can produce a key of any length and retry the key production process based on the PUF. As illustrated, the PUF circuit 411 and controller 412 will cooperate to generate another key, looping back to Step 530 until a satisfactory key is produced. Otherwise, key generation is completed, the key or keys are stored and ready to be utilized by the security logic. To use the key, the process moves the stabilized key data to the cache memory 415 from the nonvolatile memory (533). The link from the PUF circuit 411 to the nonvolatile memory 414 can be locked out after the key data is moved to the cache memory 415 (step not shown). Then, the process includes traversing the cached key data in the cache memory 415 (534), executing the security function in a protocol which can involve the host 420 and the key data for one or more keys in the cache memory (535). The host 420 can be provided data needed to execute a security protocol that relies on the key by an enrollment system. The security function can be configured in cooperation with an enrollment system or communications server, to utilize a plurality of keys. In some embodiments, the keys generated and stored are utilized only one time, or a limited number of times, to maintain high security and immunity from snooping. Also in some embodiments, a single large key can be utilized in a manner that relies upon subsets of the large key for each communication session. Other security protocols can be implemented as needed for a particular environment of use.

By using the cache memory 415, access time can be reduced for the security function to get key data, especially when the security function is operated with the same key or multiple keys many times. Also, using the cache memory 415 can increase the complexity of hacking the key data. The data in cache memory is volatile, and cannot be kept once the power is irregular. Moreover, the cache memory can be combined into a logic circuit and thereby could not be traced easily.

Figure 6:
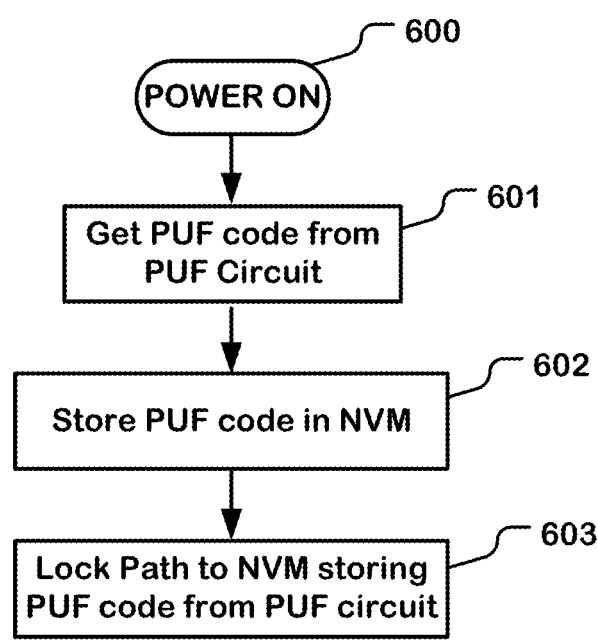
FIG. 6 is a simplified flowchart of an alternative procedure executed by a controller on an integrated circuit for executing a physical unclonable function.

FIG. 6 illustrates a procedure executed by the controller in some embodiments, particularly suited to embodiments applied to flash memory devices or other memory devices. The procedure starts with power-on (Step 600). This can occur for example when the device is mounted in a test jig or enrollment system such as described above. Also, the procedure can start with other events that signal initialization of a PUF circuit to produce an initial key. After Step 600, the circuitry used to perform the physical unclonable function is enabled, and the PUF is executed in the PUF circuitry to produce an initial key (Step 601). The initial key is then stored in a set of nonvolatile memory cells, such as cells in a particular block of cells in a nonvolatile memory array to stabilize the key (Step 602). As discussed in examples above, the set of nonvolatile memory cells may be the same set that is used by the PUF, or may be a set of nonvolatile memory cells to which the initial key is written after execution of the PUF. Thereafter, the path to the nonvolatile memory storing the PUF code from the PUF circuit is locked, to prevent use of the nonvolatile memory by the PUF circuit (Step 603). This allows use of the nonvolatile memory that had been used as the PUF circuit or stabilize the security key, as part of the memory accessible in response to an external command to read and write data.

In some embodiments, the PUF circuit elements can be accessed for other usage once the stable key is stored into NVM store. Also, in some embodiments, the cache can be used only for storing the key for fast processing by the securing logic, or in yet other embodiments can be used to store other data. In a preferred embodiment, the nonvolatile memory cells can only act as stable key storage, and act to keep the key data stable for use in operation of the device in the field.

By using the cache memory 415, access time can be reduced for the security function to get key data, especially when the security function is operated with the same key or multiple keys many times. Also, using the cache memory 415 can increase the complexity of hacking the key data. The data in cache memory is volatile, and cannot be kept once the power is irregular. Moreover, the cache memory can be combined into a logic circuit and thereby could not be traced easily.

According to the process of FIG. 5, the technology can be described as including two phases.

Phase-1 (Generate PUF code): The cache memory is used as the PUF circuit to provide the low stability PUF code.
Step-1, the controller will get the low stability PUF code from the PUF circuit.
Step-2, store the PUF code into NVM as the high stability PUF code.
Step-3, the controller will lock down the path from PUF circuit to NVM.

Phase-2 (Use PUF code): The cache memory is used to store the key data from NVM.
Step-1, the controller will move the high stability PUF code from NVM to the cache memory also used by the PUF circuit.
Step-2, load the cached PUF code from the cache memory to security function block.
Step-3, the security function will be executed with the cached PUF code as key data.

In some embodiments, the PUF circuit elements of the PUF circuit can be utilized for other functions, including as data storage elements for the mission function of the integrated circuit, after the security function is successfully executed, or for any function after the path from the PUF circuit to the NVM is locked down.

As described herein, in some embodiments, the physical unclonable function uses entropy generated using nonvolatile memory cells in a plurality of nonvolatile memory cells on the integrated circuit or multichip module. As described herein, in some embodiments, the physical unclonable function uses entropy generated using memory cells in the cache memory on the integrated circuit or multichip module. In other embodiments, different types of physical unclonable functions can be utilized.

The data set generated as described herein can have content unique to the particular integrated circuit. The data set can be used to form a response to a challenge, such as in the example of security protocols. The data set can be used as a key in an encryption protocol. The data set can be used as a unique identifier. The data set can be used as a random key.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A circuit, comprising:
a memory array, and control circuits for read and write access to the memory array in response to external commands;
logic to produce a security key using a physical unclonable function in a PUF circuit, and to store the security key in a set of nonvolatile memory cells;
security logic, including cache memory coupled to the set of nonvolatile memory cells, which using the security key from the set of nonvolatile memory cells stores a cached security key in the cache memory, and accesses the cached security key in the cache memory during execution of a security protocol; and
access control circuits coupled to the nonvolatile memory cells which include logic to disable data transfer from the PUF circuit to the set of nonvolatile memory cells after storing the security key in the set of nonvolatile memory cells; wherein
the security logic performs the security protocol to enable access to the memory array in response to the external commands; and wherein
the security key has a width, and security logic traverses the security key in the cache memory using a data path that is smaller than the width of the security key, and the cache memory has a data width at least as large as the width of the security key.

2. The circuit of claim 1, wherein the set of nonvolatile memory cells are within the memory array.

3. The circuit of claim 1, wherein the PUF circuit uses entropy of memory cells in the cache memory to generate the security key.

4. The circuit of claim 1, wherein the PUF circuit uses entropy of memory cells in the memory array to generate the security key.

5. The circuit of claim 1, wherein the PUF circuit applies the PUF to PUF circuit elements, and the PUF circuit elements are usable for other purposes after the access control logic disables data transfer from the PUF circuit to the set of nonvolatile memory cells.

6. A memory circuit, comprising:
   a memory array, and control circuits for read and write access to the memory array in response to external commands;
   logic to produce a security key using a physical unclonable function in a PUF circuit, and to store the security key in a set of memory cells in the memory array to form a stabilized security key;
   security logic, including cache memory, coupled to the memory array, which uses the security key from the set of memory cells to provide a cached security key stored in the cache memory and performs a security protocol using the security key in the cache memory to enable access to the memory array in response to the external commands; and
   access control circuits coupled to the array which include logic to disable data transfer from the PUF circuit to the set of memory cells in the memory array after storing the security key in the set of memory cells; wherein the security key has a width, and security logic traverses the security key in the cache memory using a data path that is smaller than the width of the security key, and the cache memory has a data width at least as large as the width of the security key.

7. The memory circuit of claim 6, wherein the PUF circuit uses entropy of memory cells in the cache memory to generate the security key.

8. The memory circuit of claim 6, wherein the PUF circuit uses entropy of memory cells in the memory array to generate the security key.

9. The memory circuit of claim 6, wherein the memory array, the security logic and the access control circuits are disposed on a single integrated circuit.

10. The memory circuit of claim 6, wherein memory cells in the memory array are used as PUF circuit elements, and are usable for other purposes after the access control logic disables data transfer from the PUF circuit to the set of memory cells.

11. A method for operating an integrated circuit including a memory array, and control circuits for read and write access to the memory array in response to external commands, comprising:
    using a physical unclonable function in PUF circuit elements on the integrated circuit to generate a security key;
    stabilizing the security key by storage in a set of nonvolatile memory cells;
    using the security key from the set of nonvolatile memory cells to provide a cached security key stored in a cache memory, and utilizing the cached security key stored in the cache memory in a security protocol and including in response to the security protocol enabling access to the memory array in response to the external commands; and
    disabling data transfer from the PUF circuit elements to the set of nonvolatile memory cells after storage of the security key in the set of nonvolatile memory cells;
    wherein the security key has a width, and wherein the security protocol traverses the security key in the cache memory using a data path that is smaller than the width of the security key, and the cache memory has a data width at least as large as the width of the security key.

12. The method of claim 3, wherein the set of nonvolatile memory cells are within the memory array.

13. The method of claim 9, wherein the PUF circuit elements comprise memory cells in the memory array.

14. The method of claim 11, wherein the PUF circuit elements comprise memory cells in the cache memory.

15. The method of claim 11, including using the PUF circuit elements for other purposes, after disabling data transfer from the PUF circuit elements to the set of nonvolatile memory cells.

* * * * *